United States Patent
Kim

(10) Patent No.: US 8,700,208 B2
(45) Date of Patent: Apr. 15, 2014

(54) ROTARY-TYPE TABLET FEEDER

(75) Inventor: Ho-Yeon Kim, Anyang-si (KR)

(73) Assignee: Cretem Co., Ltd., Anyang-si (KR)

( * ) Notice: Subject to any disclaimer, the term of this patent is extended or adjusted under 35 U.S.C. 154(b) by 156 days.

(21) Appl. No.: 13/322,934

(22) PCT Filed: May 24, 2010

(86) PCT No.: PCT/KR2010/003231
§ 371 (c)(1),
(2), (4) Date: Nov. 29, 2011

(87) PCT Pub. No.: WO2010/137828
PCT Pub. Date: Dec. 2, 2010

(65) Prior Publication Data
US 2012/0072017 A1    Mar. 22, 2012

(30) Foreign Application Priority Data

May 29, 2009 (KR) .................. 10-2009-0047488

(51) Int. Cl.
*G06F 17/00* (2006.01)
(52) U.S. Cl.
USPC ........... 700/240; 700/236; 700/241; 221/200; 198/757
(58) Field of Classification Search
USPC ........... 221/200; 198/755, 756, 757; 700/231, 700/236, 240, 241, 242
See application file for complete search history.

(56) References Cited

U.S. PATENT DOCUMENTS

| | | | | |
|---|---|---|---|---|
| 3,746,211 A | * | 7/1973 | Burgess, Jr. | 221/200 |
| 5,429,160 A | * | 7/1995 | Bardroff et al. | 198/757 |
| 5,473,703 A | * | 12/1995 | Smith | 221/200 |
| 6,161,675 A | * | 12/2000 | Graham | 198/757 |
| 6,554,157 B2 | | 4/2003 | Geltser et al. | |
| 8,386,073 B2 | * | 2/2013 | Kim | 700/236 |
| 8,393,495 B2 | * | 3/2013 | Kim | 700/236 |
| 2003/0057230 A1 | | 3/2003 | Stevens et al. | |

FOREIGN PATENT DOCUMENTS

| | | |
|---|---|---|
| EP | 0549533 A1 | 6/1993 |
| KR | 10-0817704 B1 | 3/2008 |
| KR | 10-2008-0085615 A | 9/2008 |
| KR | 10-0886493 B1 | 2/2009 |

(Continued)

OTHER PUBLICATIONS

European Search Report issued Sep. 27, 2012 in counterpart European Patent Application No. 10780739.8 (4 pages, in English).

(Continued)

*Primary Examiner* — Timothy Waggoner
(74) *Attorney, Agent, or Firm* — NSIP Law

(57) ABSTRACT

Provided is a rotary type tablet dispenser in which drugs can move along a guide track. The tablet dispenser includes a main body having a space part in which tablets are accommodated and including a guide track formed upward from a bottom part along an inner wall in a spiral shape to guide movement of the tablets accommodated in the space part, a vibration part configured to vibrate the main body to move the tablets accommodated in the space part of the main body upward along the guide track, and a tablet conveyance assisting member configured to move along the guide track and convey some of the tablets which cannot be conveyed along the guide track to an upper part of the main body. Accordingly, the tablets can be smoothly conveyed along the guide track by the tablet conveyance assisting member.

20 Claims, 15 Drawing Sheets

(56) References Cited

FOREIGN PATENT DOCUMENTS

| KR | 10-2009-0031169 A | 3/2009 |
|---|---|---|
| WO | WO 01/94205 A1 | 10/2001 |
| WO | WO 2009/038378 A2 | 3/2009 |
| WO | WO 2009/038380 A2 | 3/2009 |

OTHER PUBLICATIONS

International Search Report (Form PCT/ISA/210) issued Jan. 17, 2011, in counterpart International Application No. PCT/KR2010/003231 (5 pages including English Translation).

* cited by examiner

ROTARY-TYPE TABLET FEEDER

TECHNICAL FIELD

The present invention relates to a rotary type tablet dispenser installed at a drug packing apparatus, and more particularly, to a rotary type tablet dispenser in which tablets are poured into a cylindrical container to automatically supply and pack the tablets using vibration.

BACKGROUND ART

In general, a drug packing apparatus is an apparatus for automatically packing drugs when the drugs are prepared based on a prescription prescribed by a doctor or pharmacist in a hospital or pharmacy, rather than directly and manually packing the drugs.

Conventionally, the drug packing apparatus includes a plurality of cassettes disposed at an upper part thereof and arranged in a multi-stage, and different kinds of pills (tablets) are accommodated in the cassettes. The tablets accommodated in the cassettes interfaced with a computer are selectively discharged from the cassettes through a user's computer operation, and the discharged tablets are gathered in a hopper to be packed at a packing part provided at a lower part of the drug packing apparatus.

The above method of accommodating the tablets in the plurality of cassettes and discharging and packing the tablets through the operation of the computer is referred to as an automatic type, and a method of manually inserting and packing the tablets in a plurality of trays is referred to as a semi-automatic type. Meanwhile, a combination type drug packing apparatus of the automatic type and the semi-automatic type is also used.

Meanwhile, the drug packing apparatus may include a separate tablet dispenser installed inside or outside the apparatus to supply tablets such as narcotic drugs (hereinafter referred to as special tablets), which cannot be accommodated in the cassettes, to pack the special tablets with the tablets accommodated in the cassette. The conventional tablet dispenser may include a main body and a driving part. The main body includes a space part formed therein to accommodate tablets, and a guide track formed along an inner wall upward from a bottom part in a spiral shape to guide movement of the tablets accommodated in the space part. The driving part is configured to vibrate the main body such that the drugs are moved upward along the guide track to be moved to the outside of the main body.

The tablets accommodated in the tablet dispenser have various shapes, for example, a substantially spherical shape, to be in point contact with the guide track. In this case, since a contact area between the tablets and the guide track is small, some of the tablets may not be moved to an upper side of the main body along the guide track. In addition, since coated tablets may have a small frictional force against the guide track, the coated tablets may not be moved to the upper side of the main body along the guide track.

DISCLOSURE

Technical Problem

In order to solve the foregoing and/or other problems, it is an object of the present invention to provide a rotary type tablet dispenser capable of moving drugs along a guide track.

Technical Solution

The foregoing and/or other aspects of the present invention may be achieved by providing a rotary type tablet dispenser installed at a drug packing apparatus for packing tablets, including: a main body having a space part in which the tablets are accommodated and including a guide track formed upward from a bottom part along an inner wall in a spiral shape to guide movement of the tablets accommodated in the space part; a vibration part configured to vibrate the main body to move the tablets accommodated in the space part of the main body upward along the guide track; and a tablet conveyance assisting member configured to move along the guide track and convey some of the tablets which cannot be conveyed along the guide track to an upper part of the main body.

In addition, the rotary type tablet dispenser may further include a quantity adjusting module configured to control the number of tablets moved to the guide track and supply the tablets toward a hopper of the drug packing apparatus.

Further, in the rotary type tablet dispenser, the quantity adjusting module may include a module body including an insertion port into which the tablets dropped from an end of the guide track are inserted, a hopper-side supply part configured to supply the tablets toward the hopper, and a collection part configured to collect the tablets; a detection sensor configured to count the number of tablets inserted into the insertion port; and a control unit configured to compare the number of tablets detected by the detection sensor with a set reference quantity, open the hopper-side supply part when the number of detected tablets is equal to the reference quantity, and open the collection part when the number of detected tablets is not equal to the reference quantity.

Here, the tablet conveyance assisting member may have a polygonal column shape.

Furthermore, the quantity adjusting module may include a tablet conveyance assisting member detecting module configured to detect whether the tablet conveyance assisting member is introduced into the module body, and the control unit may collect the tablet conveyance assisting member in the collection part when the tablet conveyance assisting member detecting module detects the tablet conveyance assisting member.

Advantageous Effects

According to the present invention, as the rotary type tablet dispenser in accordance with the present invention pushes some tablets which cannot be conveyed along the guide track using a tablet conveyance assisting member, the tablets can be conveyed along the guide track.

DESCRIPTION OF DRAWINGS

The above and other aspects and advantages of the present invention will become apparent and more readily appreciated from the following description of exemplary embodiments, taken in conjunction with the accompanying drawings of which.

<Description of Major Reference Numerals>

| | |
|---|---|
| 10: Main body | 11: Guide track |
| 12: Bottom part | 13: Track outlet |
| 14: Narrow part | 15: Collection container |
| 20: Vibration part | 30: Tablet conveyance assisting member |
| 50: Quantity adjusting module | 51: Support frame |
| 60: Module body | 61: Insertion port |
| 62: Hopper-side supply part | 63: Collection part |
| 64: Discharge part | 65: Permanent magnet detecting part |
| 65a: RF reader part | 62a: Hopper-side path |
| 62b: First door | 62c: First solenoid |
| 63a: Collection path | 63b: Second door |
| 63c: Second solenoid | 64a: Third door |
| 64b: Third solenoid | 70: Detecting sensor |
| 80: Rotary member | 81: First blade |
| 82: Second blade | 83: Third blade |
| 85: Motor | 91: Permanent magnet |
| 91a: RF tag | 100: Rotary type tablet dispenser |
| 200: Drug packing apparatus | |

MODE FOR INVENTION

Reference will now be made in detail to the embodiments of the present invention, examples of which are illustrated in the accompanying drawings. However, it will be apparent to those skilled in the art that the following embodiments can be readily understood and modified into various types, and the scope of the present invention is not limited to the embodiments.

Figure 1:
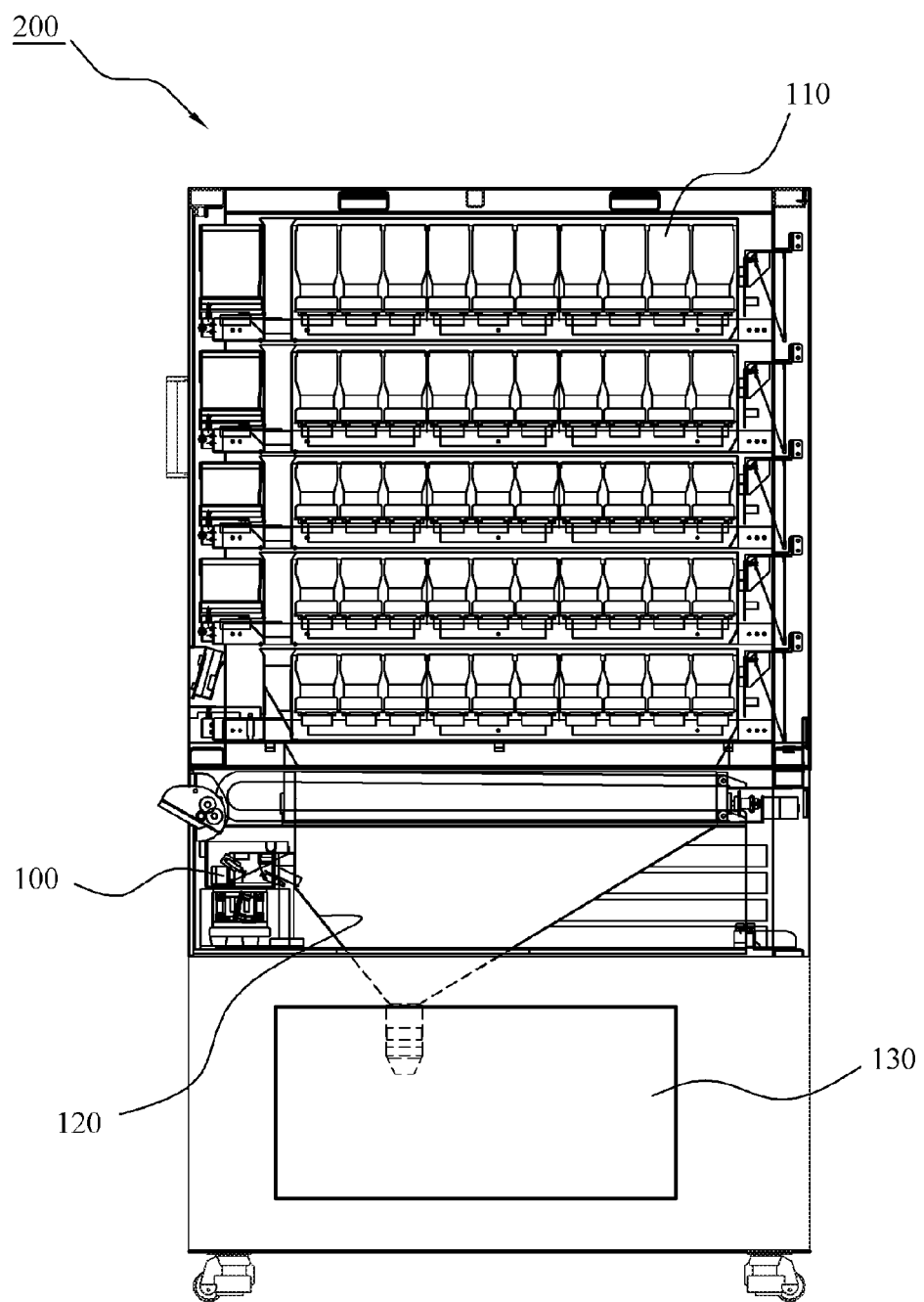
FIG. 1 is a configuration view of a drug packing apparatus, showing an in-use state of the present invention.
Figure 2:
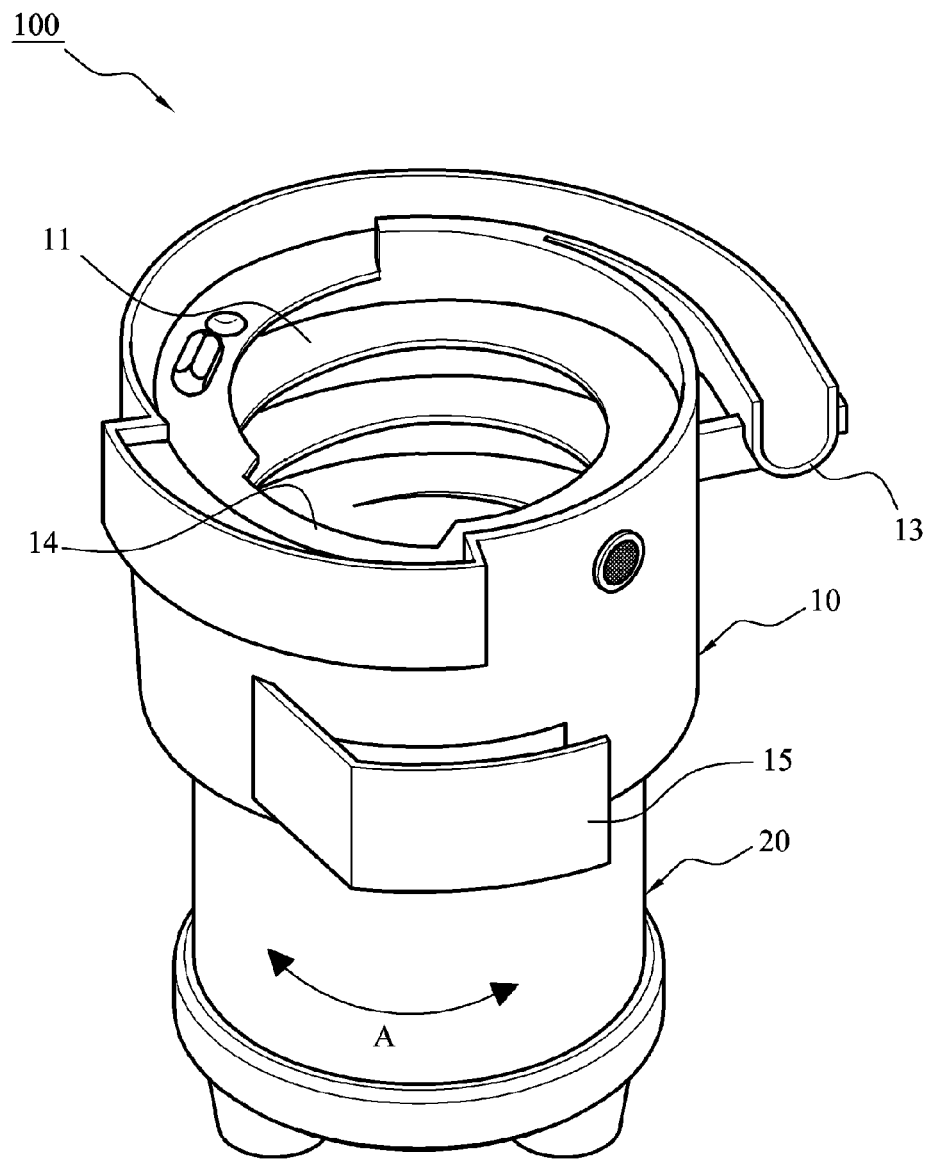
FIG. 2 is a perspective view of an embodiment of the present invention.
Figure 3:
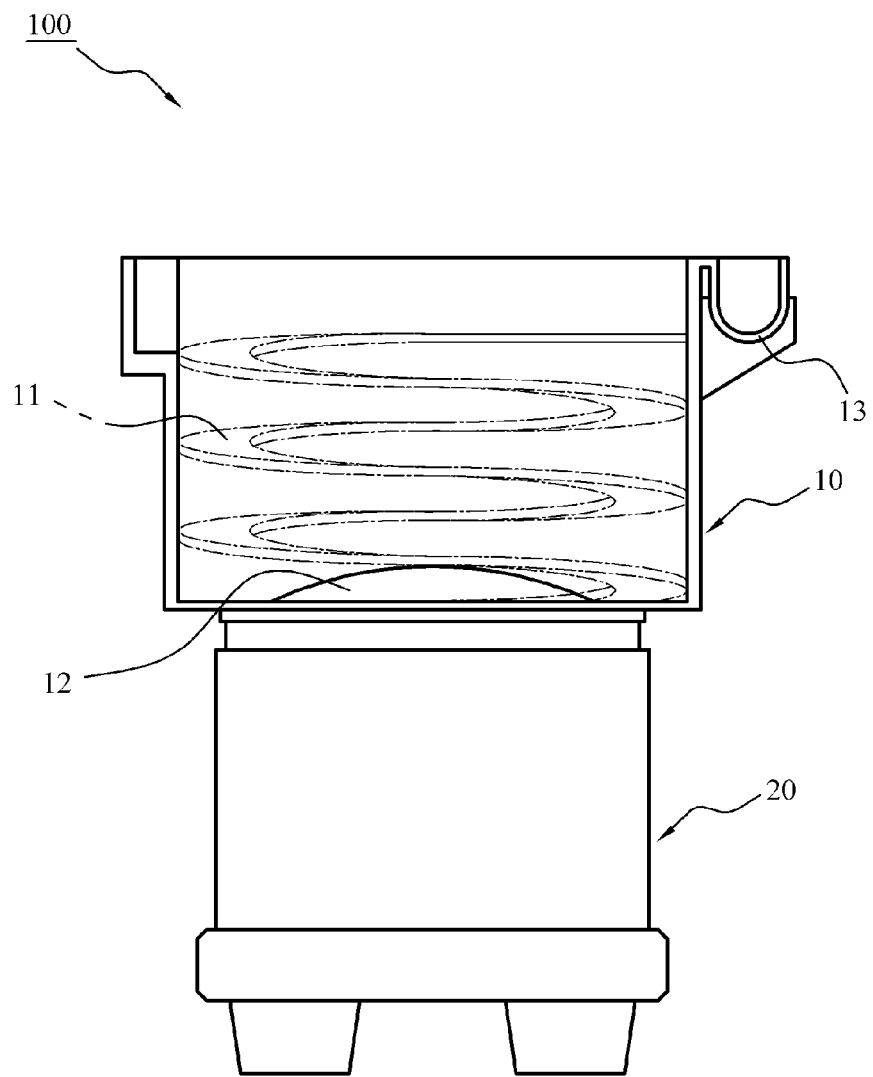
FIG. 3 is a side view of FIG. 2.
Figure 4:
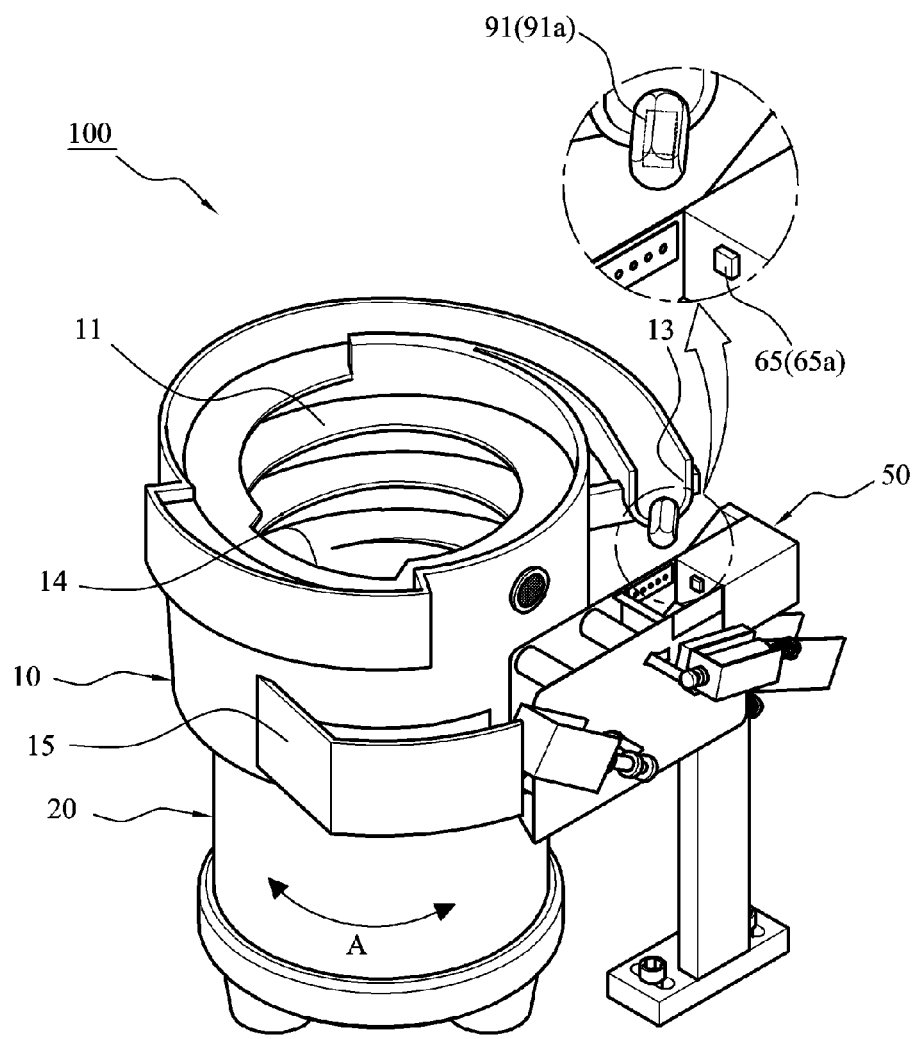
FIG. 4 is a perspective view in accordance with another embodiment of the present invention.
Figure 5:
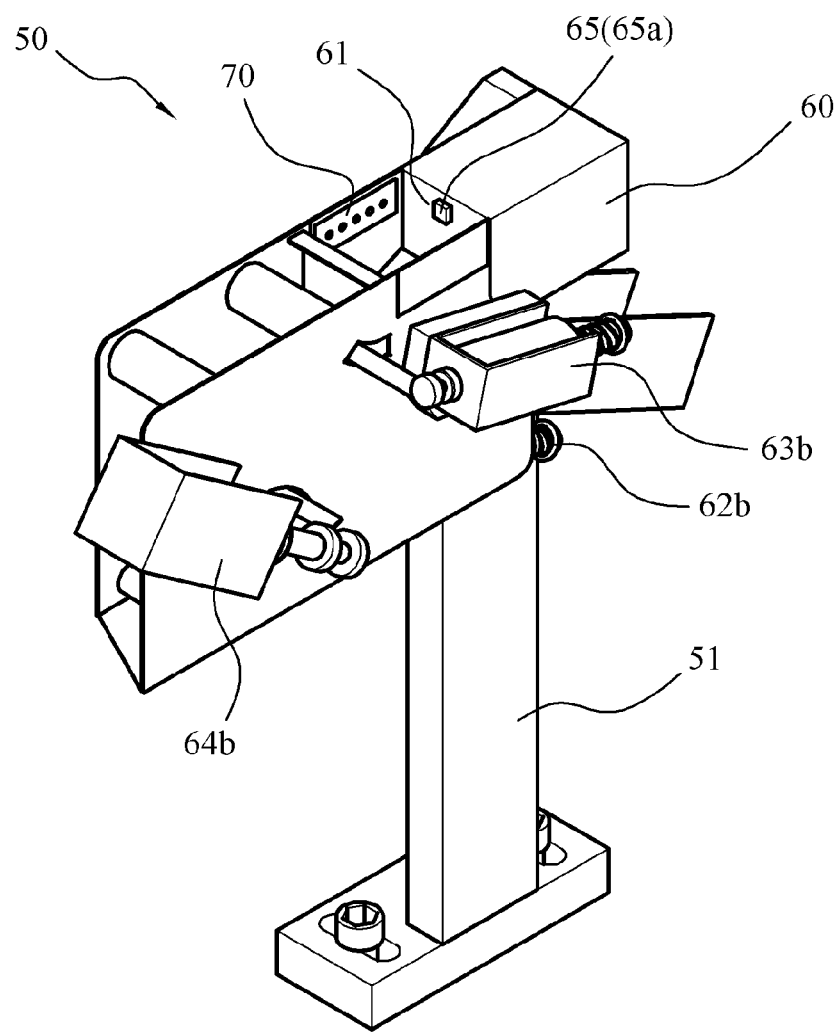
FIG. 5 is a perspective view of a quantity adjusting module in accordance with the present invention.
Figure 6:
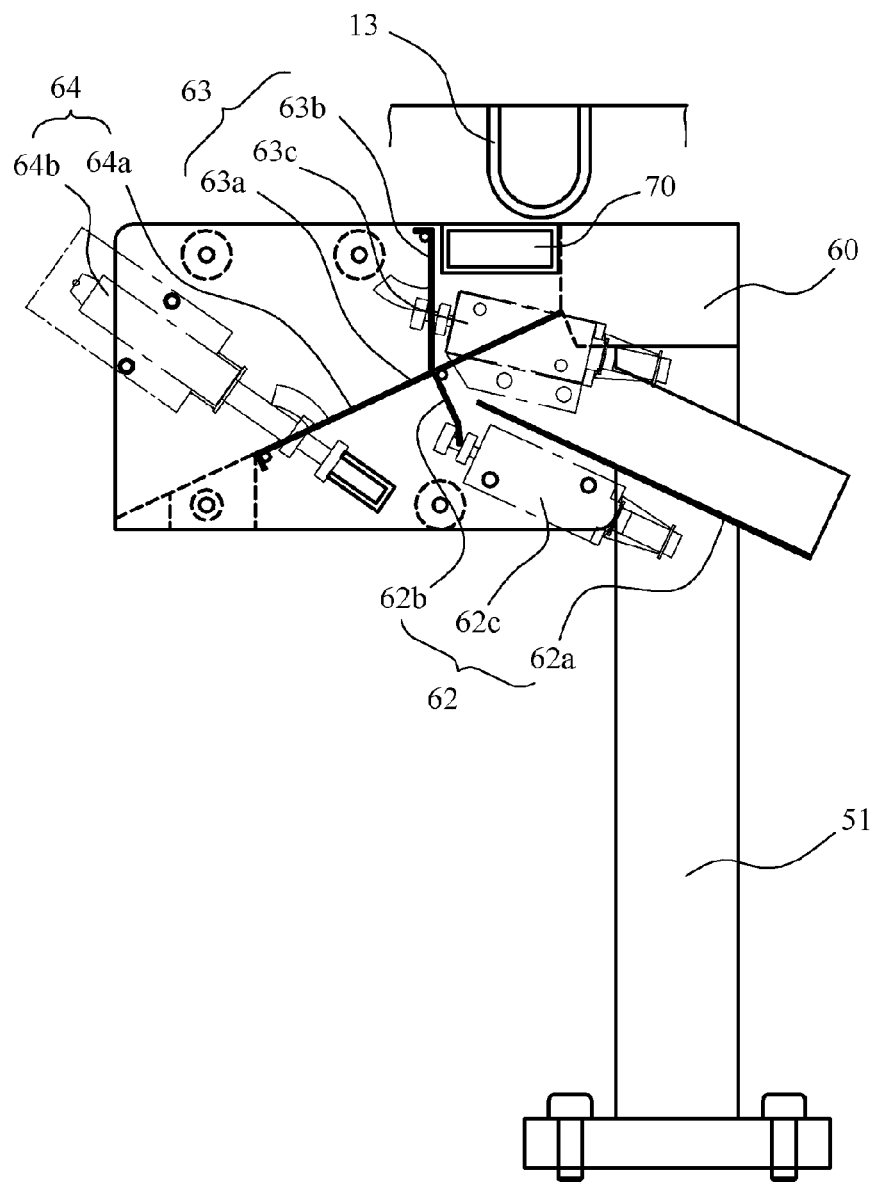
FIG. 6 is a side view of FIG. 5.

FIG. 1 is a configuration view of a drug packing apparatus, showing an in-use state of the present invention, FIG. 2 is a perspective view of an embodiment of the present invention, FIG. 3 is a side view of FIG. 2, FIG. 4 is a perspective view in accordance with another embodiment of the present invention, FIG. 5 is a perspective view of a quantity adjusting module in accordance with the present invention, FIG. 6 is a side view of FIG. 5, and FIGS. 7, 8 and 9 are views for explaining an operating state of the quantity adjusting module in accordance with the present invention.

As shown in FIGS. 1 to 3, a rotary type tablet dispenser 100 in accordance with the present invention is an apparatus installed at a drug packing apparatus 200 for packing tablets M accommodated in a plurality of cassettes 110 and configured to supply tablets which are not accommodated in the cassettes 110. The dispenser 100 includes a body 10 having a space part in which tablets are accommodated and including a guide track 11 formed upward from a bottom part 12 along an inner wall in a spiral shape to guide alignment and movement of the tablets accommodated in the space part, a vibration part 20 installed at one side of the body 10 and configured to vibrate the main body 10 such that the tablets accommodated in the space part in the main body 10 are moved upward along the guide track 11, and a tablet conveyance assisting member 30 configured to move the guide track 11 along and convey some of the tablets M which cannot be conveyed along the guide track 11 to an upper side of the main body 10.

According to an exemplary embodiment of the present invention, as shown in FIG. 1, the drug packing apparatus 200 includes the plurality of cassettes 110 arranged at an upper part of the apparatus in a multi-stage to accommodate tablets, a hopper 120 formed under the cassettes 110 to collect the tablets, the rotary type tablet dispenser 100 configured to supply the tablets to the hopper 120, the tablets under the hopper 120, and a packing part 130 configured to pack the tablets and discharge the tablets to the outside.

The rotary type tablet dispenser 100 is an apparatus for supplying the tablets to the hopper 120 by one, two or a desired number, and packing the tablets supplied from the cassettes at the packing part 130.

While the main body 10 may be manufactured in various shapes, the main body 10 preferably has a cylindrical vessel shape with an upper end opened and a lower end closed as shown in FIGS. 2 and 3. While the main body 10 may be formed of a synthetic resin, other materials may be selected. The main body 10 may be formed of a material having a relatively light weight and good strength.

The main body 10 has a space part provided therein and configured to accommodate the tablets poured by a pharmacist. While an upper side of the main body 10 is opened such that the tablets can be supplied through the upper part as shown in FIG. 2, the shape is not limited thereto but may have a separate insertion hole with the upper part closed so that the tablets can be supplied through the insertion hole.

The space part configured to pour the tablets into the upper part to accommodate the tablets is provided, and the guide track 11 having a spiral shape is formed at the inner wall, i.e., an inner circumference. Accordingly, while the main body 10 may have various appearances, the inner circumference may have a circular shape such that the guide track 11 can be easily formed at the inner circumference of the main body 10.

The guide track 11 is continuously formed from the bottom part 12 to the upper part of the main body 10. The tablets accommodated in the main body 10 are stacked on the bottom part 12 of the main body 10, and the tablets disposed on the bottom part 12 are conveyed upward to the upper part along the guide track 11 in a row. As described above, the guide track 11 functions to align the tablets in the main body 10 in a row to move them upward.

The guide track 11 may be separately manufactured to be attached to the inner wall of the main body 10 or may be integrally formed with the main body 10. A spiral inclination of the guide track may be determined such that the tablets can be smoothly conveyed upward by vibrations of the vibration part 20, which will be described. For example, when the main body 10 has a height of about 10 cm, the guide track 11 may be wound by about three turns as shown in FIG. 3.

Meanwhile, the guide track 11 may include a track outlet 13 installed at an end thereof and through which the tablets conveyed from the lower part to the upper part are discharged.

In addition, as shown in FIG. 3, the main body 10 may be concaved upward at a center of the bottom part 12. Accordingly, the tablets inserted into the main body 10 are smoothly positioned at an edge of the bottom part 12 to reduce a time that the tablets are guided to the guide track 11.

According to the exemplary embodiment of the present invention, the guide track 11 may have at least one narrow part 14 concaved in a width direction to align the tablets in a row.

As shown in FIG. 2, the narrow part 14 is formed at an appropriate position of the guide track 11 to be narrowed in a width direction of the guide track 11 to have a width relatively smaller than that of the other part of the guide track 11. The narrow part 14 having the smaller width functions to move the tablets moved along the guide track 11 in a row one by one.

That is, when a half tablet or a small tablet is guided upward along the guide track 11, two tablets may be simultaneously moved. Accordingly, the two tablets pass through the narrow part 14, one of the two tablets is naturally pushed to be dropped onto the bottom part 12 of the main body 10.

The vibration part 20 is installed at one side of the main body 10 to vibrate the main body 10 such that the tablets in the main body 10 are moved upward along the guide track 11. As shown in FIG. 2, the vibration part 20 may be connected to the lower part of the main body 10.

The vibration part 20 is rotated to a certain angle in a direction A to cause vibrations. The vibrations caused by the vibration part 20 are generated by very fine rotations. The vibration part 20 is connected to the main body 10 to rotate and vibrate the main body 10. Here, the main body 10 is designed not to generate noise due to vibrations caused by the vibration part 20. Meanwhile, the vibration part 20 may be detachably attached to the main body 10. As the main body 10 and the vibration part 20 are detachably attached to each other, use and maintenance of the main body 10 are simplified.

The tablet conveyance assisting member 30 is configured to be moved along the guide track 11. While conveying the tablets along the guide track 11 upon the operation of the vibration, the tablet conveyance assisting member 30 conveys some of the tablets which cannot be conveyed along the guide track 11 to the upper side of the main body 10. The tablet conveyance assisting member 30 may have, for example, a polygonal column shape. The tablet conveyance assisting member 30 having a polygonal column shape may be in surface contact with the guide track 11 such that the tablets can be easily conveyed along the guide track 11 by vibrations of the vibration part 20. The tablet conveyance assisting member 30 may have a size equal to the size of the capsule having a conventional capsule shape. Meanwhile, the tablet conveyance assisting member 30 may be formed of a material which is harmless to a user in case a patient accidentally swallows the member, for example, Teflon.

An operation of the rotary type tablet dispenser 100 in accordance with the present invention having the above configuration will be described as follows.

First, the tablets to be packed are introduced into the upper part of the main body 10 to be gathered on the bottom part 12 of the main body 10. Here, when the main body 10 is rotated and vibrated by the vibration part 20 connected to the lower part of the main body 10, the tablets are moved outward by a centrifugal force. The tablets moved as described above are moved upward along the guide track 11 formed at the inner circumference of the main body 10. In addition, some of the tablets that cannot be conveyed along the guide track 11 are pushed by the tablet conveyance assisting member 30 such that the tablets are moved upward along the guide track 11 to be discharged to the track outlet 13.

Accordingly, since the tablets are automatically aligned in a row and supplied one by one when the tablets are poured into the main body 10 at once, the rotary type tablet dispenser 100 in accordance with the present invention can reduce a preparation time of drugs in comparison with a method of manually inserting the tablets one by one. In addition, the tablets that cannot be conveyed along the guide track 11 are pushed by the tablet conveyance assisting member 30 to be smoothly conveyed along the guide track 11.

Meanwhile, the rotary type tablet dispenser 100 in accordance with the present invention may further include a quantity adjusting module 50 configured to control a number of tablets moved to the guide track 11 and supply the tablets toward the hopper 120 of the drug packing apparatus 200.

As shown in FIG. 4, the quantity adjusting module 50 is installed at one side of the main body 10 to uniformly control a number of tablets moved from the guide track 11 in a row by one or a desired number to supply the tablets toward the hopper 120. That is, the quantity adjusting module 50 counts the number of tablets moved and dropped from the guide track 11 of the main body 10 in a row. When the number of tablets counted as above satisfies one or a desired number, the tablets are discharged toward the hopper 120 to be supplied, and when the number of counted tablets does not satisfy one or the desired number, the tablets are collected to be reused or discharged to the outside.

According to the exemplary embodiment of the present invention, as shown in FIG. 5, the quantity adjusting module 50 includes a module body 60 having an insertion port 61 through which the tablets dropped from the end of the guide track 11 are inserted, a hopper-side supply part 62 configured to supply the tablets toward the hopper 120, and a collection part 63 configured to collect the tablets; a detection sensor 70 configured to count the number of tablets inserted into the insertion port 61; and a control unit (not shown) configured to compare the number of tablets detected by the detection sensor 70 with a set reference quantity, open the hopper-side supply part 62 when the number of detected tablets is equal to the reference quantity, and open the collection part 63 when the number of detected tablets is not equal to the reference to quantity. Meanwhile, the quantity adjusting module 50 may further include a support frame 51 configured to provide stable support from a bottom thereof.

The module body 60 has a structure including the insertion port 61, the hopper-side supply part 62 and the collection part 63 to accommodate the tablets moved and dropped from the guide track 11 in a row, and supply the accommodated tablets toward the hopper 120 or recollect the tablets in the main body 10.

The insertion port 61 may be formed by opening one side of the upper part of the module body 60 such that the tablets sequentially dropped from the guide track 11 are freely dropped to be inserted thereinto.

The hopper-side supply part 62 and the collection part 63 selectively discharge the tablets inserted into the module body 60 toward the hopper 120 or collect the tablets in the main body 10.

According to the exemplary embodiment of the present invention, as shown in FIG. 6, the hopper-side supply part 62 is constituted by a hopper-side path 62a, a first door 62b configured to open/close the hopper-side path 2a, and a first solenoid 62c configured to drive the first door 62b. The collection part 63 is constituted by a collection path 63a, a second door 63b configured to open/close the collection path 63a, and a second solenoid 63c configured to drive the second door 63b.

The hopper-side path 62a is configured to supply the tablets inserted into the insertion port 61 to the hopper 120. The first door 62b is pivotally hinged at one side of the hopper-side path 62a to open/close the hopper-side path 62a by the first solenoid 62c. The collection path 63a is configured such that the tablets inserted into the insertion port 61 are recollected in the main body 10. The second door 63b is pivotally hinged at one side of the collection path 63a to open/close the collection path 63a by the second solenoid 63c.

Here, the main body 10 includes a collection container 15 formed at a lower part of a side surface thereof and in communication with the main body 10 such that the tablets moved through the collection part 63 can be collected in the collection container 15 to be re-introduced into the main body 10.

Meanwhile, the collection part 63 may include a discharge part having a third door 64a installed at one side thereof to discharge the tablets to the outside and a third solenoid 64b configured to drive the third door 64a.

The detection sensor 70 is installed at an appropriate position in the module body 60 to count the number of tablets inserted into the insertion port 61. Preferably, the detection sensor 70 is formed at a position adjacent to the insertion port 61 such that the inserted tablets can be detected without any omission.

Although not shown, the detection sensor 70 may include at least one light emitting part configured to irradiate light and at least one light receiving part configured to receive the light irradiated from the light emitting part to detect whether the tablets pass therethrough. The detection sensor 70 constituted as above receives the light irradiated from the light emitting part through the light receiving part to count the number of objects, i.e., tablets passing between the light emitting part and the light receiving part. More preferably, the light emitting part and the light receiving part are arranged in one-to-one correspondence with each other so that the tablets passing between the light emitting part and the light receiving part can be more precisely detected.

The control unit (not shown) compares the number of tablets detected by the detection sensor 70 with the set reference quantity, opens the hopper-side supply part 62 when the number of detected tablets is equal to the reference quantity, and opens the collection part 63 when the number of detected tablets is not equal to the reference quantity. The control unit may be, for example, a microprocessor.

The control unit is interfaced with the detection sensor 70 to perform a process of comparing the number of tablets numbered by the detection sensor 70 with the preset reference quantity (mainly, one). Next, when the number of tablets detected by the detection sensor 70 is equal to the reference quantity, the tablets are moved toward the hopper 120 to be packed by the packing part 130 and discharged. On the other hand, when the number of tablets detected by the detection sensor 70 is not equal to the reference quantity, the tablets are fed back to be recollected in the main body 10 and reused.

Meanwhile, the control unit can control a moving velocity of the tablets to increase a vibration velocity of the vibration part 20 until the tablets are detected by the detection sensor 70, uniformly maintain the vibration velocity of the vibration part 20 when the number of tablets detected by the detection sensor 70 is equal to the reference quantity, and lower the vibration velocity of the vibration part 20 when the number of tablets detected by the detection sensor 70 is not equal to the reference quantity.

Accordingly, when the vibration of the vibration part 20 begins after the tablets are inserted into the main body 10, the tablets can be moved from the bottom part 12 to the upper part of the main body 10 at a relatively high velocity to reduce a time to move to the track outlet 13. Meanwhile, when the tablet is first dropped from the track outlet 13 to be detected by the detection sensor 70 and the number of dropped tablets is equal to the reference quantity, the vibration velocity of the vibration part 20 is uniformly maintained as it is. However, when the number of tablets detected by the detection sensor 70 exceeds the reference quantity, the vibration velocity of the vibration part 20 is lowered. That is, when the number of tablets detected by the detection sensor 70 exceeds the reference quantity, such a phenomenon occurs because the vibration velocity of the vibration part 20 is higher than a desired velocity such that the moving velocity of the tablets becomes too fast. Accordingly, in order to reduce inferiority caused by the tablets which are unintentionally and additionally dropped, the vibration velocity of the vibration part 20 should be lowered such that the tablets are correctly dropped one by one.

Meanwhile, the guide track 11 may further include an auxiliary sensor (not shown) configured to detect whether the tablet arrives at the outlet, and the control unit may be configured to uniformly maintain the vibration velocity of the vibration part 20 when the auxiliary sensor detects the tablet.

As described above, as the auxiliary sensor is provided, the moving velocity of the tablets can be more effectively controlled in comparison with the method of uniformly maintaining the vibration velocity of the vibration part 20 when the detection sensor 70 detects a first tablet. That is, the auxiliary sensor is installed at the guide track 11 to detect a time at which the tablet arrives at the outlet of the guide track 11 before the detection sensor 70. Accordingly, as the auxiliary sensor is provided, the moving velocity of the tablets can be controlled before the tablets are dropped into the insertion port 61.

In addition, the quantity adjusting module 50 may further include a stopper (not shown) configured to prevent the tablet held at an end of the outlet of the guide track 11 from being rapidly dropped into the insertion port 61 or the tablet from being additionally dropped when the detector sensor 70 detects the tablet.

The stopper may be formed at a side of the track outlet 13 of the guide track 11 or may be separately formed from the guide track 11. Preferably, the stopper may have a door shape configured to open/close the end of the outlet of the guide track 11 such that the tablet held by a threshold of the end of the outlet is rapidly dropped into the insertion port 61 and the following tablet is blocked not to be dropped into the insertion port 61. As described above, the stopper completely prevents the tablet from being unintentionally and additionally dropped from the guide track 11 and prevents delay of a time taken to detect the tablet using the detection sensor 70 due to holding of the tablet by the threshold of the outlet of the guide track 11.

According to an exemplary embodiment of the present invention, an operation of the quantity adjusting module 50 will be described with reference to FIGS. 7, 8 and 9 as follows. Here, it is assumed that the reference quantity set by the control unit is one.

Figure 7:
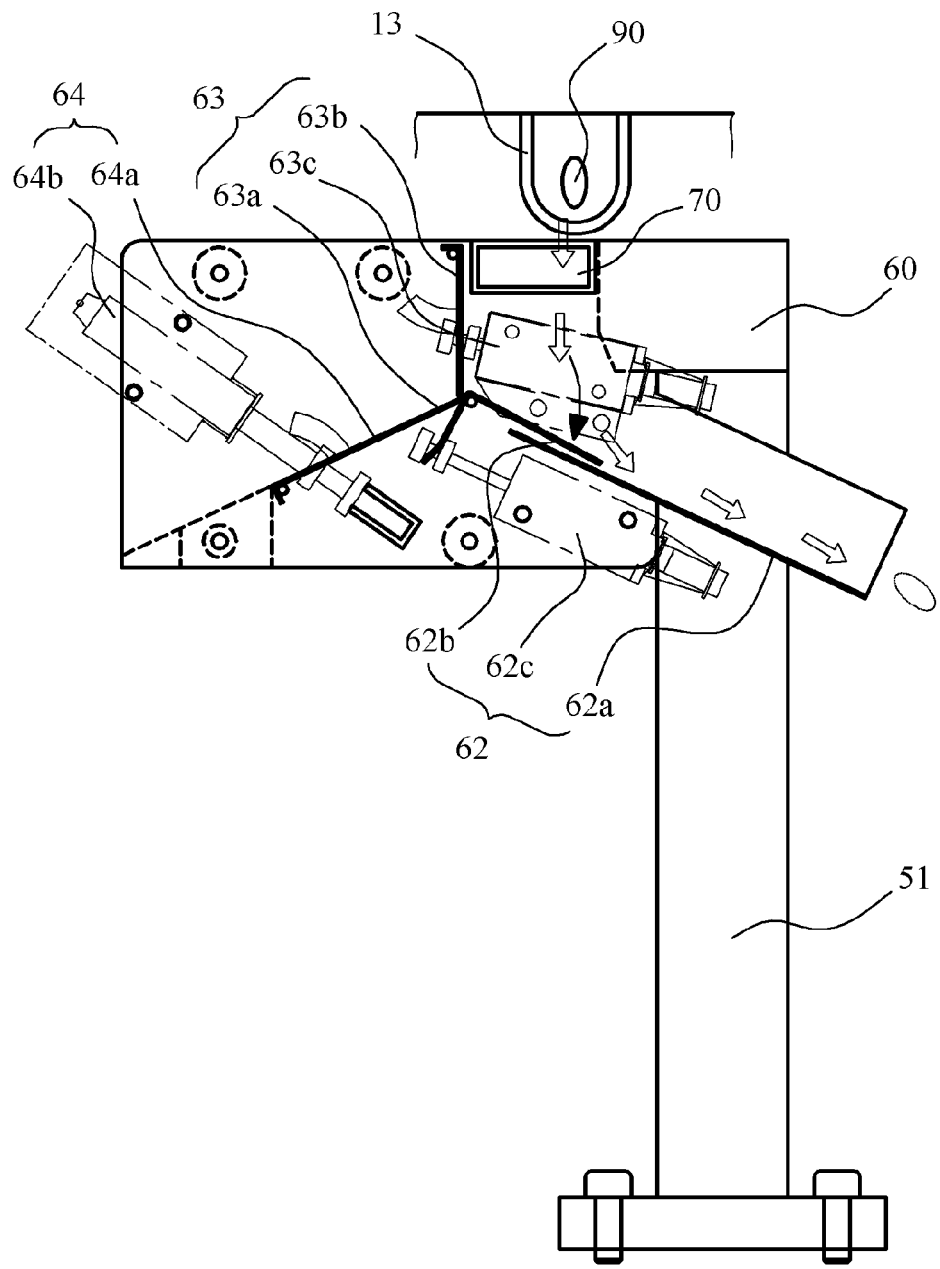
FIGS. 7, 8 and 9 are views for explaining an operating state of the quantity adjusting module in accordance with the present invention.

First, as shown in FIG. 7, when the number of tablets 90 detected by the detection sensor 70 is one, the control unit controls to open the hopper-side supply part 62 such that the tablets 90 move toward the hopper 120. The tablets 90 satisfying the above conditions are gathered in the hopper 120 with the tablets discharged from the cassettes 110 to be packed by the packing part 130.

Figure 8:
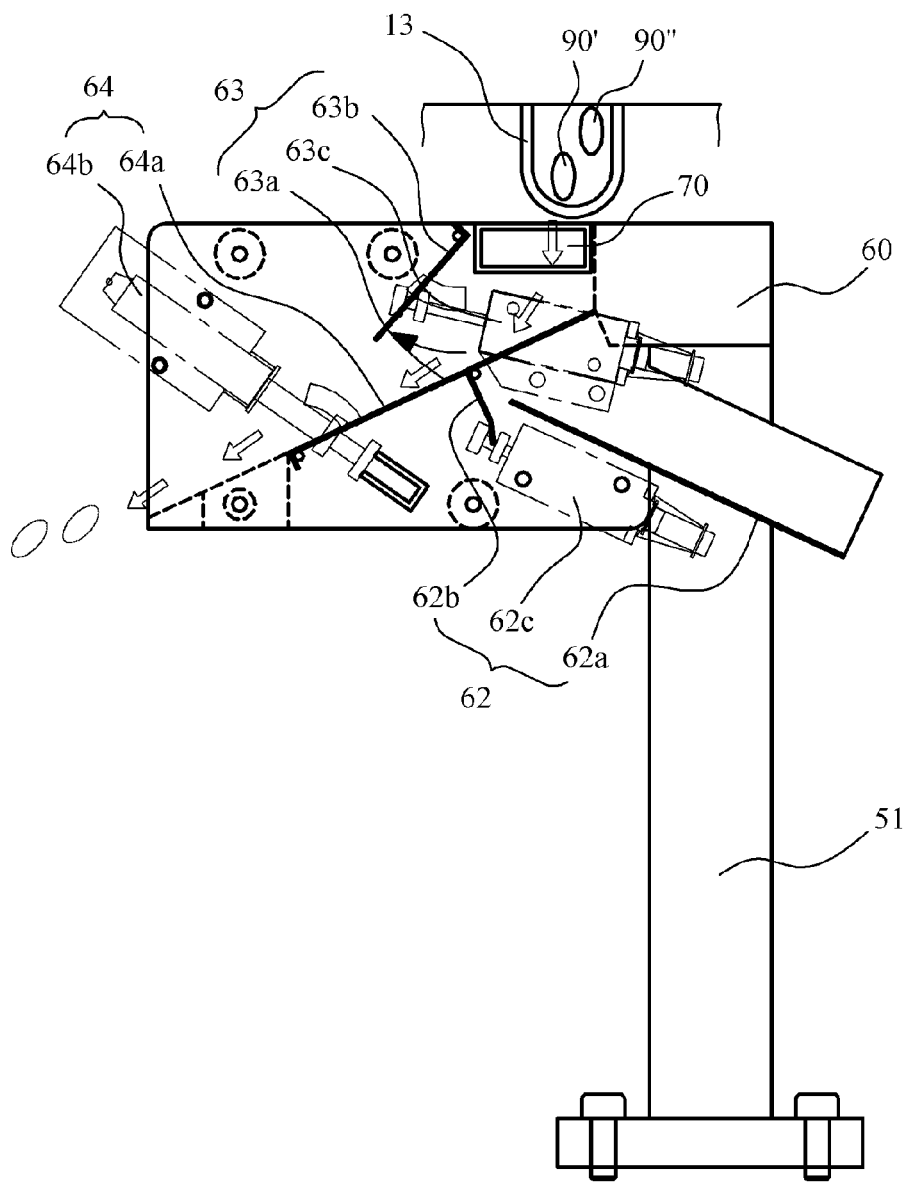

Meanwhile, as shown in FIG. 8, when the number of tablets 90' and 90" detected by the detection sensor 70 is two, that is, as described above, when the tablet 90" is unintentionally and additionally dropped into the insertion port 61 or the tablets 90' and 90" are adhered to each other and dropped, the control unit opens the collection part 63 to collect the tablets 90' and 90" to be reused.

Figure 9:
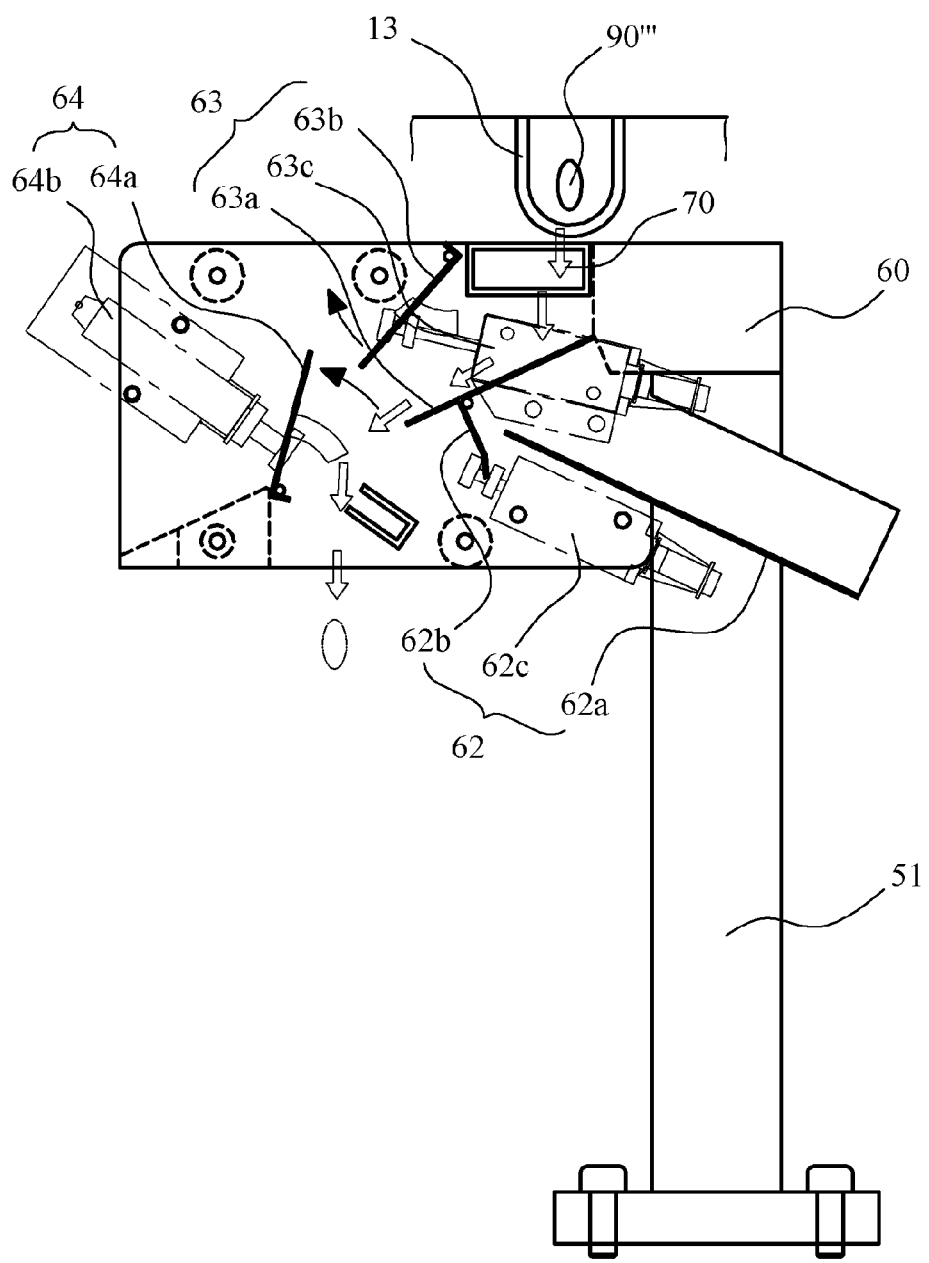

In addition, when the use of the drug packing apparatus 200 is completed to collect the tablets in the main body 10 to the outside, as shown in FIG. 9, a discharge to part 64 is opened with the collection part 63 opened such that the tablet 90' and 90" can be easily discharged to the outside.

In particular, the rotary type tablet dispenser 100 in accordance with the present invention includes the guide track 11 having a spiral shape and configured to guide and convey the tablets such that the tablets are moved upward in a row. As described above, as the main body 10 has a structure of moving the tablets upward, there is a height difference between the track outlet 13 of the guide track 11 and the bottom part 12 of the main body 10 to which the tablets are collected. Accordingly, since the unintentionally dropped tablets are freely dropped due to gravity without a separate collection apparatus, a configuration of the tablet dispenser becomes simple and thus the entire volume of the tablet dispenser can be reduced.

Meanwhile, the quantity adjusting module 50 may include a tablet conveyance assisting member detecting module. The tablet conveyance assisting member detecting module detects whether the tablet conveyance assisting member 30 is introduced into the module body 60. The tablet conveyance assisting member detecting module can prevent the tablet conveyance assisting member 30 from being discharged to the packing part 130 to be mixed with the tablets which are to be taken by a patient. To this end, when the tablet conveyance assisting member detecting module detects the tablet conveyance assisting member 30, the control unit collects the tablet conveyance assisting member 30 in the collection part 63.

The tablet conveyance assisting member detecting module may include, for example, a permanent magnet 91 and a permanent magnet detecting part 65. The permanent magnet 91 is included in the tablet conveyance assisting member 30. The permanent magnet detecting part 65 is disposed in the insertion port 61 to detect a magnetic field of the permanent magnet 65 in the tablet conveyance assisting member 30. The permanent magnet detecting part 65 may be, for example, a magnetic sensor. The magnetic sensor may be, for example, a Hall sensor or a magneto-diode. The Hall sensor generates an output signal when a magnetic body approaches and does not generate an output signal when the magnetic body does not approach. The magneto-diode is a semiconductor device in which voltage and current characteristics are varied according to external magnetic properties.

When the tablet conveyance assisting member 30 is discharged from the main body 10 to be introduced into the insertion port 61 of the quantity adjusting module 50, the permanent magnet detecting part 65 detects the magnetic field of the permanent magnet 91 in the tablet conveyance assisting member 30 to transmit an operation signal to the control unit. The control unit operates the second solenoid 63c to open the collection path 63a according to the operation signal, and the tablet conveyance assisting member 30 is collected in the collection container 15 through the collection path 63a to be introduced into the main body 10.

The tablet conveyance assisting member detecting module may include, as another example, an RF tag 91a and an RF reader part 65a. The RF tag 91a is included in the tablet conveyance assisting member 30. The RF reader part 65a is disposed at the insertion port 61 to detect the RF tag 91a. That is, the RF tag 91a may be an RF chip, and the RF reader part 65a reads information contained in the RF chip.

Meanwhile, the rotary type tablet dispenser 100 may further include a speaker 92. During a process in which the tablet conveyance assisting member 30 is collected in the collection container 15 through the collection path 63a by the tablet conveyance assisting member detecting module, when the tablet conveyance assisting member 30 is discharged through the insertion port 61 due to malfunction of the quantity adjusting module 50, the speaker outputs a beeping sound to inform a pharmacist that the tablet conveyance assisting member is conveyed to the packing part and mixed with the tablets which are to be taken by a patient. To this end, the speaker may be electrically connected to the RF reader part 65a. The RF reader part 65a can detect the RF tag 91a within a certain range. When the tablet conveyance assisting member 30 is discharged through the insertion port 61 to arrive at the packing part 130, the RF tag 91a in the tablet conveyance assisting member 30 departs from a range that can be detected by the RF reader part 65a. In this case, the RF reader part 65a transmits an operation signal to the speaker 92, and the speaker 92 output at least one beeping sound. A pharmacist listens the beeping sound and removes the tablet conveyance assisting member 30 from a tablet-packed paper to prevent the patient from swallowing the tablet conveyance assisting member 30.

Hereinafter, a technical configuration of the quantity adjusting module 50 in accordance with another embodiment of the present invention will be described in detail with reference to the accompanying drawings.

Figure 10:
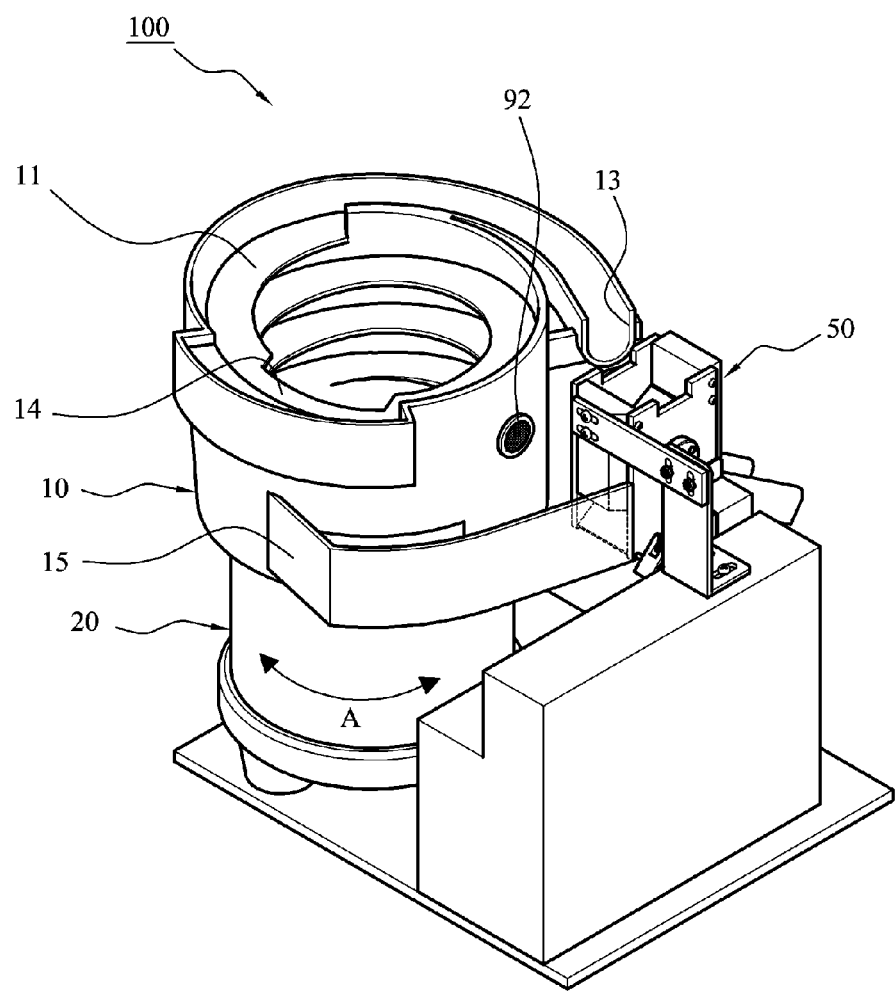
FIG. 10 is a perspective view showing still another embodiment of the present invention.
Figure 11:
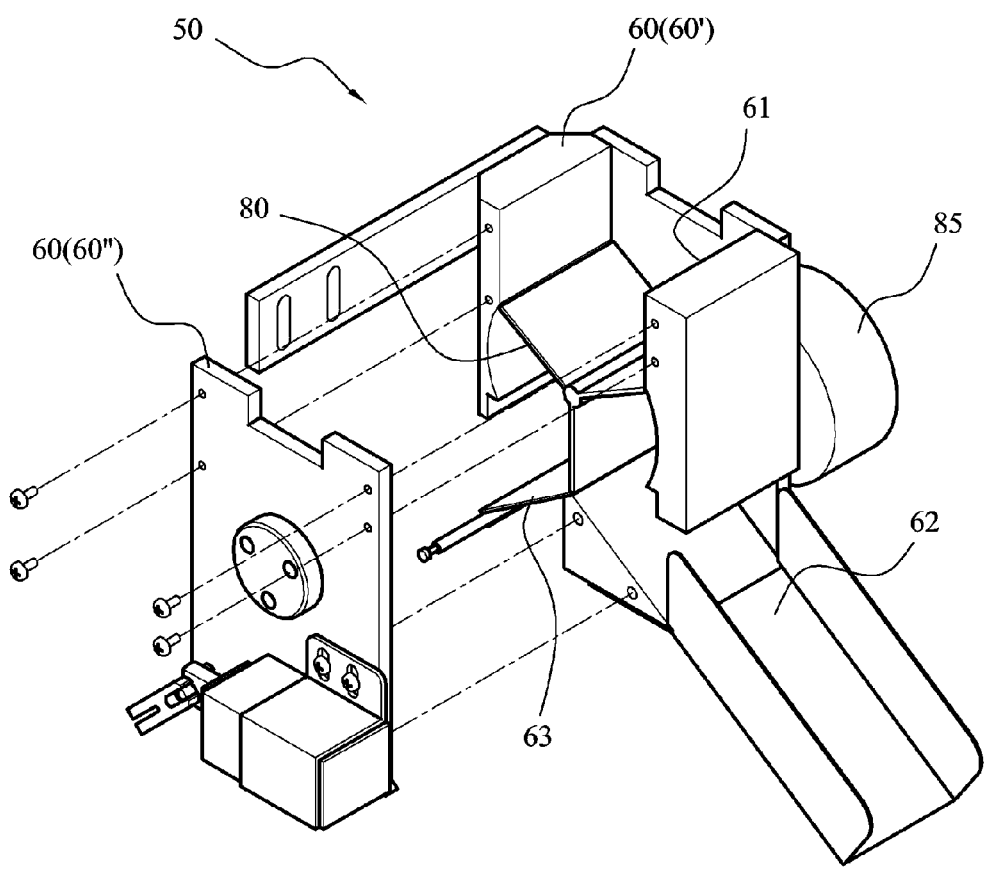
FIG. 11 is an exploded perspective view of a quantity adjusting module in accordance with yet another embodiment of the present invention.
Figure 12:
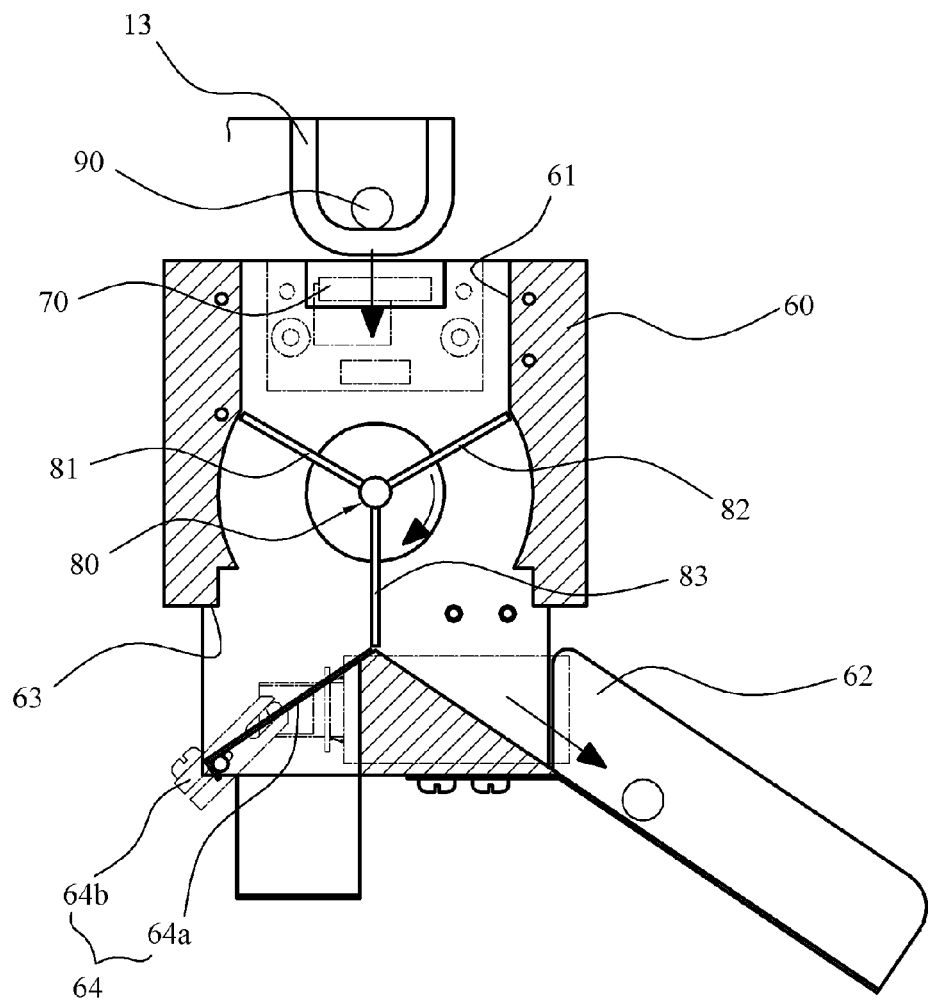
FIGS. 12, 13 and 14 are views for explaining an operating state of the quantity adjusting module in accordance with yet another embodiment of the present invention.
Figure 13:
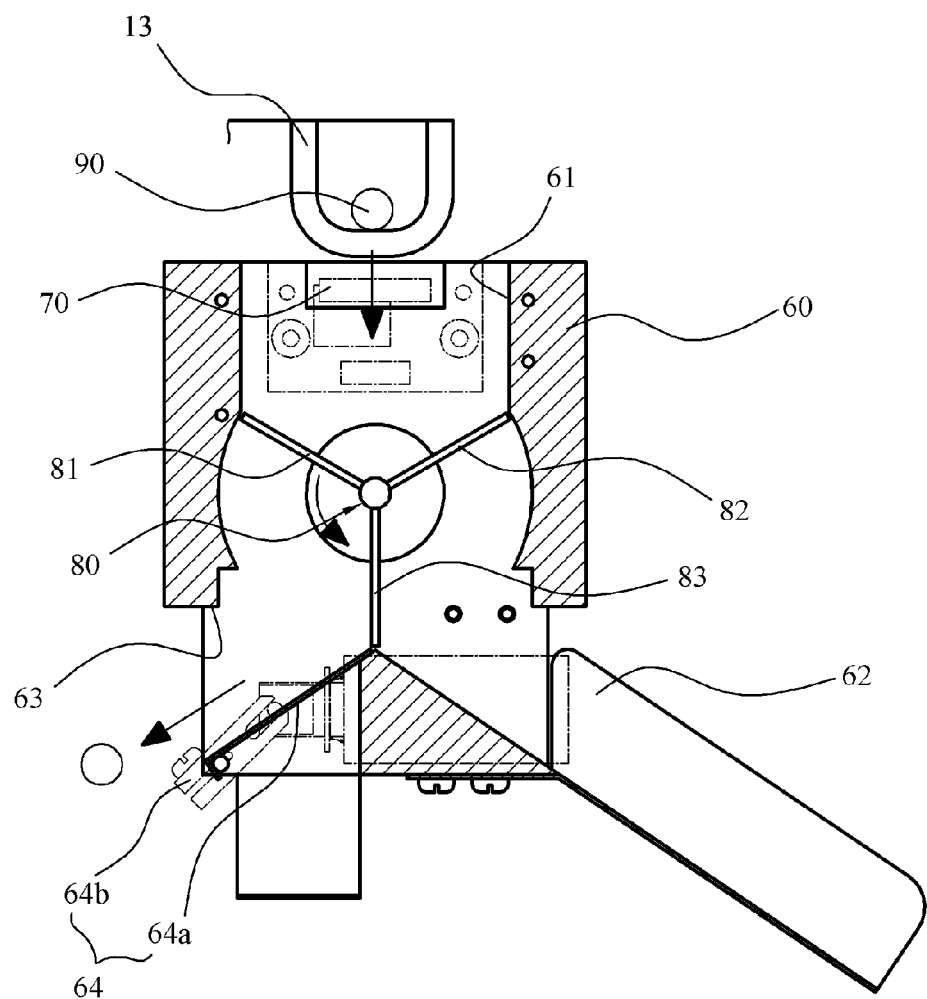
Figure 14:
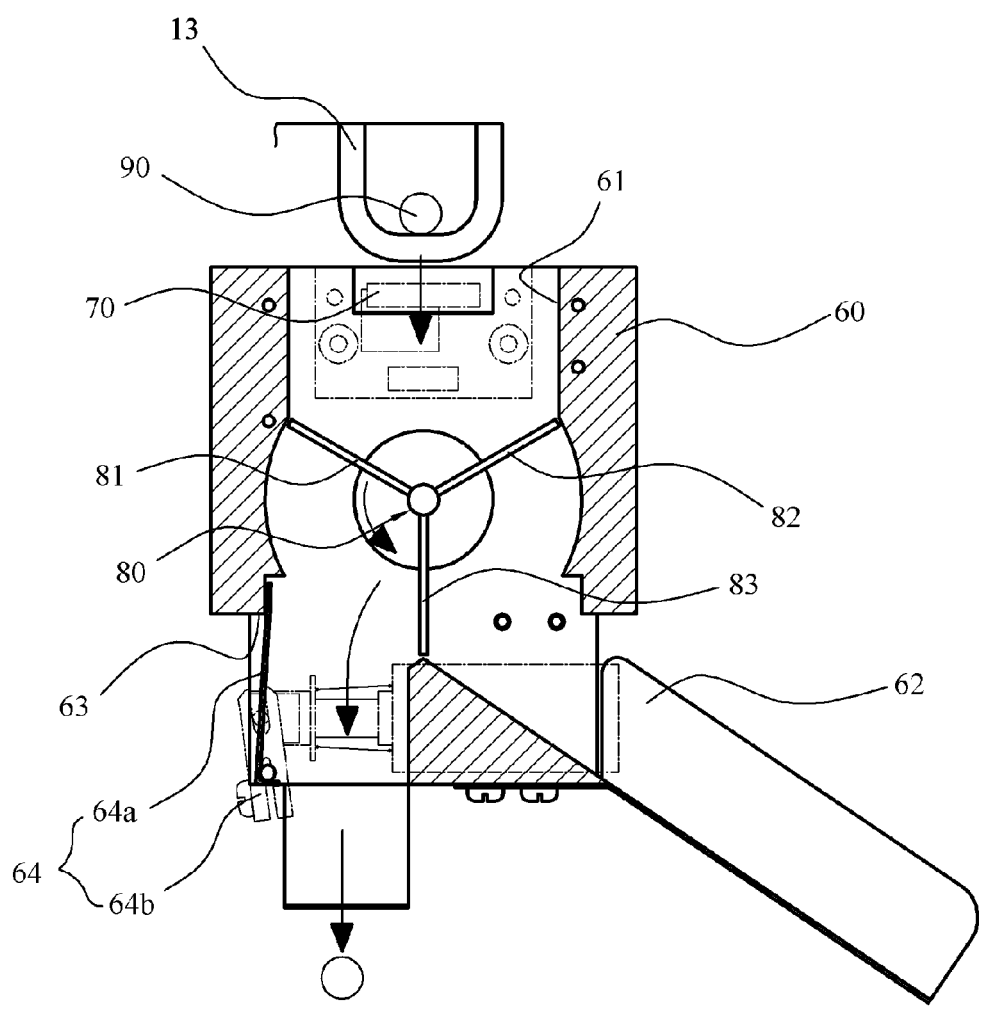

FIG. 10 is a perspective view showing still another embodiment of the present invention, FIG. 11 is an exploded perspective view of a quantity adjusting module in accordance with yet another embodiment of the present invention, and FIGS. 12, 13 and 14 are views for explaining an operating state of the quantity adjusting module in accordance with yet another embodiment of the present invention.

In the quantity adjusting module 50, as shown in FIGS. 10 to 14, the module body 60 includes a rotary member 80 disposed under the insertion port 61 and having a plurality of blades 81, 82 and 83 formed in a radial shape to accommodate the tablets 90 dropped between the blades 81, 82 and 83 from the insertion port 61 and selectively discharge the tablets 90 to the hopper-side supply part 62 or the collection part 63 according to a rotational direction; and a motor 85 configured to rotate the rotary member 80 clockwise or counterclockwise under control of the control unit.

The rotary member 80 is connected to the motor 85 to be rotated clockwise or counterclockwise in the module body 60. The rotary member 80 includes the plurality of blades 81, 82 and 83. The blades 81, 82 and 83 have a radial shape such as a windmill or a waterwheel shape. That is, as shown in FIG. 11, the motor 85 is mounted on a rear surface of a rear module body 60', the rotary member 80 is connected to a shaft of the motor 85, and then a module body 60" is fastened to the rear module body 60', completing assembly thereof. The hopper-side supply part 62 and the collection part 63 are formed at both sides of a lower part of the rotary member 80 to discharge the tablets dropped onto the rotary member 80 toward the hopper 120 or collect the tablets in the collection container 15 of the tablet dispenser 100.

Meanwhile, the blades 81, 82 and 83 may be formed at an angular interval of 120°. When the blades 81, 82 and 83 are formed at three positions at an angular interval of 120°, the tablets can be efficiently and economically accommodated and discharged. Of course, the blades may be variously formed at an angular interval of 90° to 120°.

The operation of the quantity adjusting module 50 will be described in detail with reference to FIGS. 12 to 14.

FIG. 12 shows that the tablets 90 dropped from the track outlet 13 of the tablet dispenser 100 are counted by the detection sensor 70 and then discharged to the hopper-side supply part 62 when the number of tablets is equal to the set reference quantity. That is, the tablets 90 dropped from the track outlet 13 pass through the detection sensor 70 to be dropped between the first blade 81 and the second blade 82 of the rotary member 80. Here, since the number of tablets 90 detected by the detection sensor 70 is equal to the reference quantity, the rotary member 80 is rotated 120° clockwise, and the tablets accommodated between the first blade 81 and the second blade 82 are discharged to the hopper-side supply part 62.

FIG. 13 shows that the tablets 90 dropped from the track outlet 13 of the tablet dispenser 100 are counted by the detection sensor 70 and then collected in the collection part 63 when the number of tablets is not equal to the set reference quantity. That is, the tablets 90 dropped from the track outlet 13 pass through the detection sensor 70 to be dropped between the first blade 81 and the second blade 82 of the rotary member 80. Here, since the number of tablets 90 detected by the detection sensor 70 is not equal to the reference quantity, the rotary member 80 is rotated 120° counterclockwise and the tablets accommodated between the first blade 81 and the second blade 82 are discharged to the collection part 63.

Meanwhile, the discharge part 64 may include a door 64*a* formed at one side thereof and configured to discharge the tablets 90 to the outside and a solenoid 64*b* configured to drive the door 64*a*.

FIG. 14 shows that the tablets 90 dropped from the track outlet 13 of the tablet dispenser 100 are counted by the detection sensor 70 and then the tablets 90 are discharged to the outside through the discharge part 64 when the number of tablets is not equal to the set reference quantity or use of the tablet dispenser 100 is completed. That is, the tablets 90 dropped from the track outlet 13 pass through the detection sensor 70 to be dropped between the first blade 81 and the second blade 82 of the rotary member 80. Here, since the quantity adjusting module 50 is set to a discharge mode, the rotary member 80 is rotated 120° counterclockwise and the door 64*a* connected to the solenoid 64*b* is opened to discharge the tablets 90 to the outside.

According to the embodiment as described above, the tablets are discharged to the hopper-side supply part 62 or the collection part 63 in a rotary manner, rather than opening/closing the door, and thus, the tablet dispenser can be smoothly driven not to generate noise. Meanwhile, it is possible to prevent the tablets from becoming stuck to the inner wall of the module body 60 and not sliding during a tablet discharge process. Accordingly, a tablet discharge delay phenomenon can be prevented and malfunction can also be prevented.

In addition, when the first blade 81, the second blade 82 and the third blade 83 of the rotary member 80 are rotated, since the tablets dropped between the first blade 81 and the second blade 82 by only one rotation are discharged to the hopper-side supply part 62 or the collection part 63 and simultaneously the third blade 83 prepares to accommodate the tablets dropped into the insertion port 61, a structure thereof becomes very stable and energy efficiency can be increased.

Figure 15:
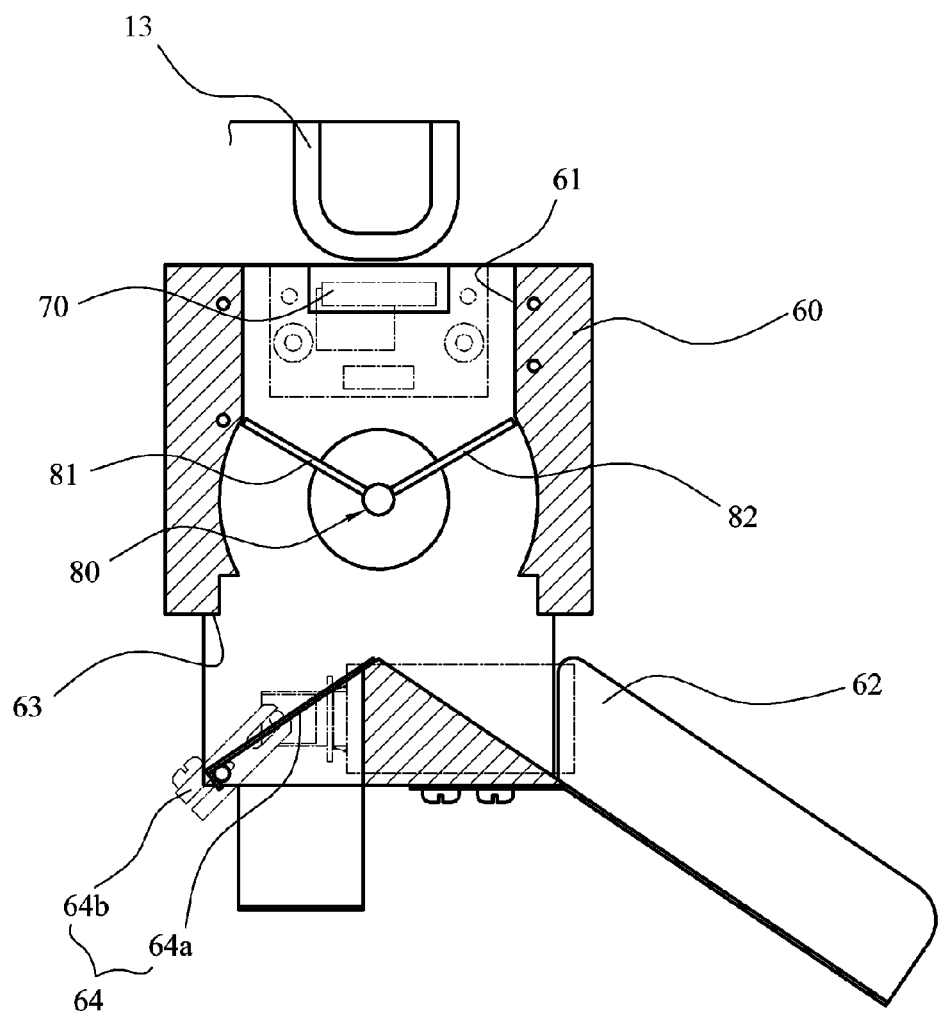
FIG. 15 is a view for explaining a quantity adjusting module in accordance with yet another embodiment of the present invention.

Further, according to another embodiment of the present invention, as shown in FIG. 15, the rotary member 80 may include two blades 81 and 82. The tablets accommodated between the two blades 81 and 82 are rotated clockwise or counterclockwise to be selectively discharged to the hopper-side supply part 62 or the collection part 63.

The rotary type tablet dispenser in accordance with the present invention is not limited in its application fields, and may be used in a semi-automatic drug packing apparatus or an automatic/semi-automatic combined drug packing apparatus in which a plurality of cassettes are installed, and may be variously used as a table supply means of the drug packing apparatus for controlling a number of tablets and supplying the tablets.

The foregoing description concerns an exemplary embodiment of the invention, is intended to be illustrative, and should not be construed as limiting the invention. The present teachings can be readily applied to other types of devices and apparatuses. Many alternatives, modifications, and variations within the scope and spirit of the present invention will be apparent to those skilled in the art.

The invention claimed is:

1. A rotary type tablet dispenser installed at a drug packing apparatus for packing tablets, comprising:
 a main body having a space part in which the tablets are accommodated and including a guide track formed upward from a bottom part along an inner wall in a spiral shape to guide movement of the tablets accommodated in the space part;
 a vibration part configured to vibrate the main body to move the tablets accommodated in the space part of the main body upward along the guide track; and
 a tablet conveyance assisting member configured to move along the guide track and convey some of the tablets which cannot be conveyed along the guide track to an upper part of the main body.

2. The rotary type tablet dispenser according to claim 1, wherein the vibration part is detachably attached to the main body.

3. The rotary type tablet dispenser according to claim 1, wherein the main body has a bottom part, a center of which protrudes upward.

4. The rotary type tablet dispenser according to claim 1, wherein the guide track has at least one narrow part concaved in a width direction to move the tablets in a row.

5. The rotary type tablet dispenser according to claim 1, further comprising a quantity adjusting module configured to control the number of tablets moved to the guide track and supply the tablets toward a hopper of the drug packing apparatus.

6. The rotary type tablet dispenser according to claim 5, wherein the quantity adjusting module comprises:
 a module body including an insertion port into which the tablets dropped from an end of the guide track are inserted, a hopper-side supply part configured to supply the tablets toward the hopper, and a collection part configured to collect the tablets;
 a detection sensor configured to count the number of tablets inserted into the insertion port; and
 a control unit configured to compare the number of tablets detected by the detection sensor with a set reference quantity, open the hopper-side supply part when the number of detected tablets is equal to the reference quantity, and open the collection part when the number of detected tablets is not equal to the reference quantity.

7. The rotary type tablet dispenser according to claim 6, wherein the hopper-side supply part comprises a hopper-side path, a first door configured to open/close the hopper-side path, and a first solenoid configured to drive the first door, and
 the collection part comprises a collection path, a second door configured to open/close the collection path, and a second solenoid configured to drive the second door.

8. The rotary type tablet dispenser according to claim 7, wherein the collection part comprises a discharge part including a third door formed at one side and configured to discharge the tablets to the outside and a third solenoid configured to drive the third door.

9. The rotary type tablet dispenser according to claim 6, wherein the control unit controls a moving velocity of the tablets by increasing a vibration velocity of the vibration part before the detection sensor detects the tablets, uniformly maintaining the vibration velocity of the vibration part when the number of tablets detected by the detection sensor is equal to the reference quantity, and lowering the vibration velocity of the vibration part when the number of tablets detected by the detection sensor is not equal to the reference quantity.

10. The rotary type tablet dispenser according to claim 9, wherein the guide track further comprises an auxiliary sensor configured to detect whether the tablet arrives at an outlet side, and
the control unit uniformly maintains the vibration velocity of the vibration part when the auxiliary sensor detects the tablet.

11. The rotary type tablet dispenser according to claim 6, wherein the main body is provided with a collection container disposed at a lower part of a side surface thereof and in communication with the inside of the main body, and the tablets moving through the collection part are collected in the collection container to be re-introduced into the main body.

12. The rotary type tablet dispenser according to claim 6, wherein the quantity adjusting module further comprises a stopper configured to prevent the tablet held by an end of an outlet side of the guide track from being rapidly dropped into the insertion port or the tablet from being additionally dropped when the detection sensor detects the tablets.

13. The rotary type tablet dispenser according to claim 6, wherein the module body comprises:
a rotary member disposed under the insertion port and having blades formed in a radial shape to accommodate the tablets dropped between the blades from the insertion port and selectively discharge the accommodated tablets to the hopper-side supply part or the collection part according to a rotational direction; and
a motor configured to rotate the rotary member clockwise or counterclockwise to selectively open the hopper-side supply part or the collection part under control of the control unit.

14. The rotary type tablet dispenser according to claim 13, wherein the blades are disposed at an interval of 120°.

15. The rotary type tablet dispenser according to claim 13, wherein the module body further comprises a discharge part configured to discharge the tablets released toward the collection part to the outside.

16. The rotary type tablet dispenser according to claim 15, wherein the discharge part comprises:
a door disposed at one side thereof and configured to discharge the tablets to the outside; and
a solenoid configured to drive the door.

17. The rotary type tablet dispenser according to claim 6, wherein the quantity adjusting module comprises a tablet conveyance assisting member detecting module configured to detect whether the tablet conveyance assisting member is introduced into the module body, and
the control unit collects the tablet conveyance assisting member in the collection part when the tablet conveyance assisting member detecting module detects the tablet conveyance assisting member.

18. The rotary type tablet dispenser according to claim 17, wherein the tablet conveyance assisting member detecting module comprises:
a permanent magnet included in the tablet conveyance assisting member; and
a permanent magnet detecting part disposed at the insertion port to detect a magnetic field of the permanent magnet,
wherein the permanent magnet detecting part is a magnetic sensor.

19. The rotary type tablet dispenser according to claim 17, wherein the tablet conveyance assisting member detecting module comprises:
an RF tag included in the tablet conveyance assisting member; and
an RF reader part disposed at the insertion port to detect the RF tag.

20. The rotary type tablet dispenser according to claim 1, wherein the tablet conveyance assisting member has a polygonal column shape.

\* \* \* \* \*